US012607977B2

(12) United States Patent
Ravipalli et al.

(10) Patent No.: US 12,607,977 B2
(45) Date of Patent: Apr. 21, 2026

(54) SHARED NON-BLOCKING CROSSBAR BUFFER CIRCUITS AND METHODS

(71) Applicant: Intel Corporation, Santa Clara, CA (US)

(72) Inventors: Sreedhar Ravipalli, Cupertino, CA (US); Mahesh Kumashikar, Bangalore (IN); Md Altaf Hossain, Portland, OR (US); Ankireddy Nalamalpu, Portland, OR (US)

(73) Assignee: Altera Corporation, San Jose, CA (US)

( * ) Notice: Subject to any disclaimer, the term of this patent is extended or adjusted under 35 U.S.C. 154(b) by 782 days.

(21) Appl. No.: 17/852,859

(22) Filed: Jun. 29, 2022

(65) Prior Publication Data

US 2022/0326676 A1     Oct. 13, 2022

(51) Int. Cl.
*G05B 19/05*          (2006.01)
*G06F 15/78*          (2006.01)

(52) U.S. Cl.
CPC ......... *G05B 19/056* (2013.01); *G05B 19/054* (2013.01); *G06F 15/7867* (2013.01)

(58) Field of Classification Search
CPC .. G05B 19/056; G05B 19/054; G06F 15/7867
See application file for complete search history.

(56) References Cited

U.S. PATENT DOCUMENTS

| | | | |
|---|---|---|---|
| 7,734,895 B1 * | 6/2010 | Agarwal ................... | G06F 8/52 |
| | | | 712/15 |
| 8,352,669 B2 * | 1/2013 | Wu ..................... | H04L 49/3045 |
| | | | 710/242 |
| 10,643,297 B2 | 5/2020 | Mellempudi et al. | |
| 2008/0164907 A1 * | 7/2008 | Mercaldi-Kim ..... | H03K 19/177 |
| | | | 326/41 |
| 2018/0322057 A1 * | 11/2018 | Rosenbluth ............. | G06F 15/76 |
| 2019/0171601 A1 * | 6/2019 | Nachimuthu ............. | G06F 9/50 |
| 2021/0264163 A1 | 8/2021 | Varerkar et al. | |

FOREIGN PATENT DOCUMENTS

CN          102541678 A  *  7/2012

OTHER PUBLICATIONS

Translation of CN-102541678-A (Year: 2012).*

* cited by examiner

*Primary Examiner* — Henry Tsai
*Assistant Examiner* — John B Roche
(74) *Attorney, Agent, or Firm* — InventIQ Legal LLP; Steven J. Cahill

(57) ABSTRACT

A circuit system includes a processing circuit, an accelerator circuit, and a buffer circuit that stores packets of data and that is coupled to the processing circuit and to the accelerator circuit. The buffer circuit functions as a crossbar circuit by allowing each of the accelerator circuit and the processing circuit to access at least one of the packets of data stored in the buffer circuit during access to another one of the packets of data stored in the buffer circuit.

20 Claims, 3 Drawing Sheets

SHARED NON-BLOCKING CROSSBAR BUFFER CIRCUITS AND METHODS

FIELD OF THE DISCLOSURE

The present disclosure relates to electronic circuit systems, and more particularly, to techniques for shared non-blocking crossbar buffer circuits.

BACKGROUND

Configurable logic integrated circuits can be configured by users to implement desired custom logic functions. In a typical scenario, a logic designer uses computer-aided design tools to design a custom logic circuit. When the design process is complete, the computer-aided design tools generate configuration data. The configuration data is then loaded into configuration memory elements that configure configurable logic circuits in the integrated circuit to perform the functions of the custom logic circuit. Configurable logic integrated circuits can be used for co-processing in big-data or fast-data applications. For example, configurable logic integrated circuits may be used in application acceleration tasks in a datacenter and may be reprogrammed during datacenter operation to perform different tasks.

DETAILED DESCRIPTION

Figure 1:
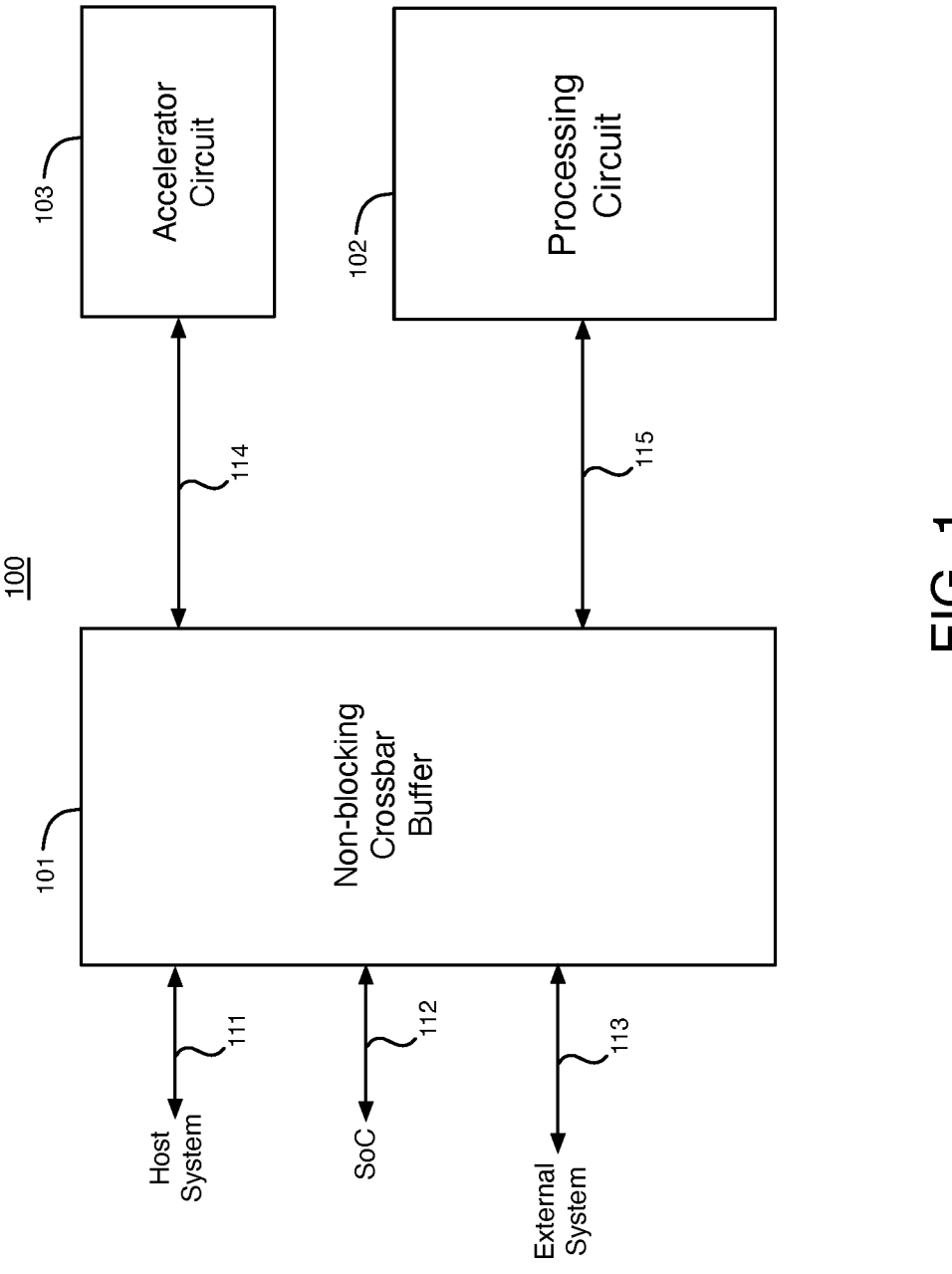
FIG. 1 is a diagram that illustrates an example of an infrastructure processing system (IPS) that includes a shared non-blocking crossbar buffer circuit, a processing circuit, and an accelerator circuit that accelerates functions for the processing circuit.

A server computer in a datacenter can include one or more host processors and one or more coprocessors that function as acceleration devices. The host processor may be tasked to perform a pool of jobs/tasks. In order to improve the speed at which these tasks are performed, one or more of the coprocessor integrated circuit (IC) dies can be used to perform a subset of the pool of tasks. The host processor can send acceleration requests to one of the coprocessor IC dies. The coprocessor IC die functions as an accelerator circuit.

Hardware acceleration devices can be used for co-processing in big-data, fast-data, or high performance compute (HPC) applications in one or more server computers in a datacenter. Accelerator circuits can, for example, be used in server computers to perform networking functions for packets of data that are transmitted to the server computers through one or more networks. By offloading acceleration functions (e.g., computationally intensive tasks) from a host processor to one or more coprocessors that function as acceleration devices, the host processor is freed up to perform other critical processing tasks. The use of hardware accelerators can therefore help deliver improved speed, latency, power efficiency, and flexibility for acceleration functions, such as cryptography, end-to-end cloud computing, networking, storage, artificial intelligence, autonomous driving, virtual reality, augmented reality, gaming, and other data-centric applications. An acceleration device may be a programmable logic integrated circuit (IC), such as a field programmable gate array (FPGA) that contains soft logic circuitry programmed to perform acceleration functions for a host processor, an application specific IC (ASIC) that contains hard logic circuitry designed to perform acceleration functions for a host processor, or an IC that combines soft and hard logic circuitry.

This disclosure discusses circuit systems that can be implemented in integrated circuit devices, including configurable (programmable) logic devices such as field programmable gate arrays (FPGAs). As discussed herein, an integrated circuit (IC) may include hard logic and/or soft logic. As used herein, "hard logic" generally refers to circuits in an integrated circuit device that are not programmable by an end user. The circuits in an integrated circuit device (e.g., in a configurable IC) that are programmable by the end user are referred to as "soft logic."

According to some examples disclosed herein, an infrastructure processing system (IPS) includes a processing integrated circuit, an accelerator circuit that accelerates functions for the IPS, and a non-blocking crossbar buffer circuit that is shared between the accelerator circuit and the processing circuit. The infrastructure processing system (IPS) can be, for example, a programmable network device that intelligently manages system-level infrastructure resources by securely accelerating functions in a datacenter. The IPS can accelerate infrastructure functions, including storage virtualization, network virtualization, and security with dedicated protocol accelerators. The IPS can free up processing cores by shifting storage and network virtualization functions that were previously performed in software on the processing cores to the IPS.

The non-blocking crossbar buffer circuit stores packets of data that are received, for example, from external systems through a network, from a host system in a datacenter, or from a system-on-chip (SoC) in the datacenter. The processing circuit and the accelerator circuit can access the packets of data or portions of the packets of data that are stored in the non-blocking crossbar buffer circuit. The non-blocking crossbar buffer circuit prevents data transfers through the non-blocking crossbar buffer circuit from blocking other data transfers through the non-blocking crossbar buffer circuit. In some embodiments, only portions of the data packets stored in the non-blocking crossbar buffer circuit are transferred to the processing circuit and to the accelerator circuit to perform specific functions. These techniques reduce the need to transmit entire data packets from the non-blocking crossbar buffer circuit to the processing and accelerator circuits. Modifications to the data packets that are made by the processing circuit and the accelerator circuit can then be transferred back to the non-blocking crossbar buffer circuit.

Throughout the specification, and in the claims, the term "connected" means a direct electrical connection between the circuits that are connected, without any intermediary devices. The term "coupled" means either a direct electrical connection between circuits or an indirect electrical connection through one or more passive or active intermediary devices. The term "circuit" may mean one or more passive and/or active electrical components that are arranged to cooperate with one another to provide a desired function.

One or more specific examples are described below. In an effort to provide a concise description of these examples, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

FIG. 1 is a diagram that illustrates an example of an infrastructure processing system (IPS) 100 that includes a shared non-blocking crossbar buffer circuit 101, a processing circuit 102, and an accelerator circuit 103 that accelerates functions for the processing circuit 102. The IPS 100 can be, for example, in a single integrated circuit (IC) die or in multiple IC dies. In some implementations, each of the circuits 101-103 can, for example, be in the same IC die. As examples, an IC die containing circuits 101-103 can be a programmable logic integrated circuit (IC) or a processor IC die, such as a such as a microprocessor, a central processing unit (CPU), or a graphics processing unit (GPU) IC die. Alternatively, circuits 101-103 can, for example, be in two or three separate IC dies.

The non-blocking crossbar buffer circuit 101 can, for example, be implemented in hard logic circuitry that is in the same IC die as the processing circuit 102 and/or the accelerator circuit 103. Alternatively, the non-blocking crossbar buffer circuit 101 can be, for example, in a separate application specific IC. The processing circuit 102 can be, for example, a programmable logic IC die, such as an FPGA, or a processor IC die, such as a microprocessor, CPU, or a graphics processing unit (GPU) IC die. The processing circuit 102 can contain soft logic circuitry (e.g., in a soft logic fabric region) that is in the same IC die as one or both of the non-blocking crossbar buffer circuit 101 or the accelerator circuit 103. The accelerator circuit 103 can, for example, include hard logic circuitry or soft logic circuitry designed to perform acceleration functions. The accelerator circuit 103 can, for example, be in an application specific IC (ASIC) die or in the same IC die as one or both of processing circuit 102 or non-blocking crossbar buffer circuit 101. IC dies in IPS 100 can, for example, be housed in the same integrated circuit package or coupled to a circuit board.

Figure 2:
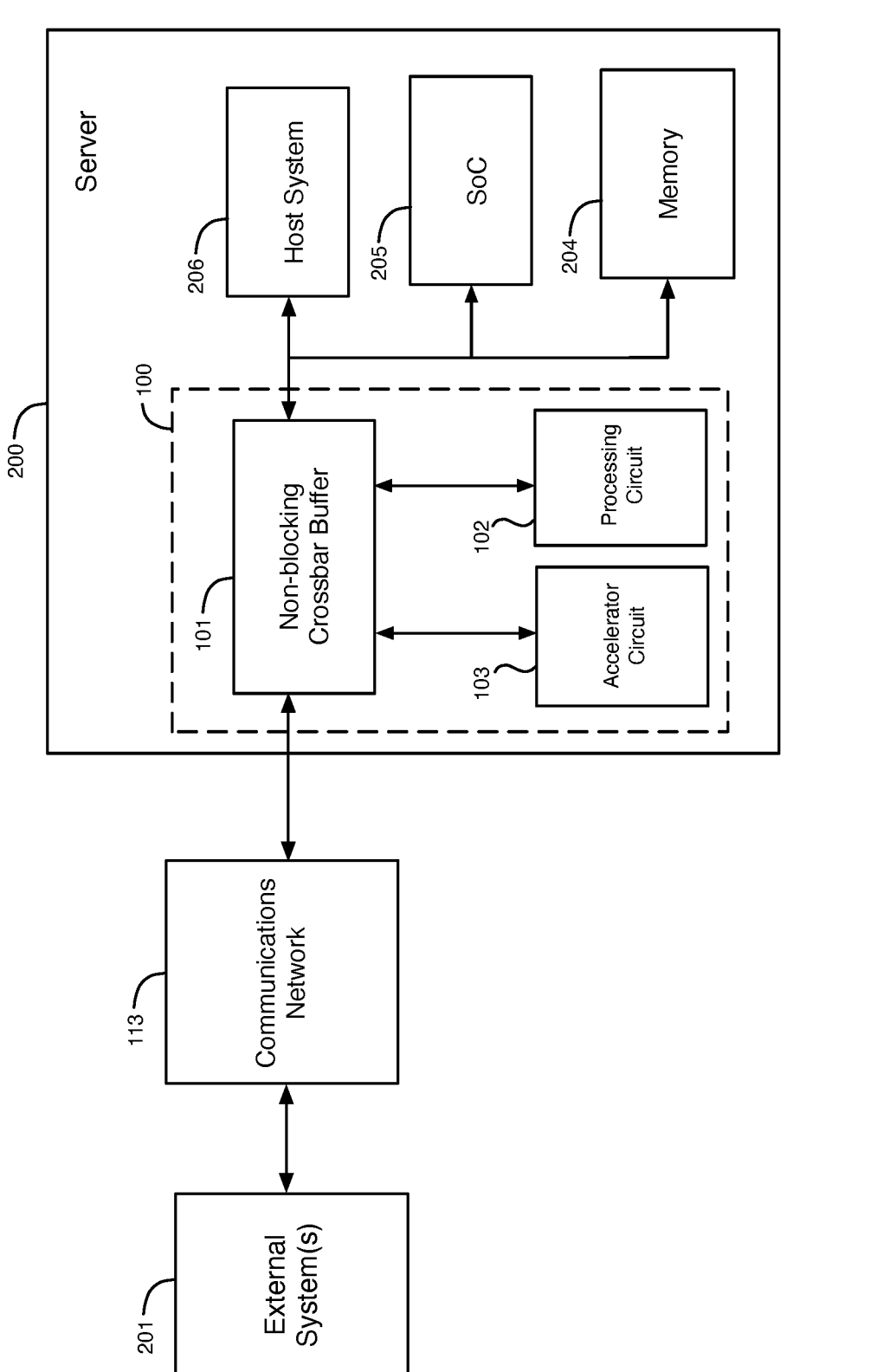
FIG. 2 is a diagram that illustrates an example of a server computer that includes the infrastructure processing system (IPS) of FIG. 1.

FIG. 2 is a diagram that illustrates an example of a server computer 200 that includes the infrastructure processing system (IPS) 100 of FIG. 1. In the example of FIG. 2, the server computer 200 includes the IPS 100 shown in FIG. 1, one or more memory devices 204, system-on-chip (SoC) 205, and host system 206. The SoC 205 can, for example, include one or more processing cores. FIG. 2 also shows one or more external systems 201 and communications network 113 that may, for example, be in a datacenter with server computer 200. The external system(s) 201 are coupled to transmit packets of data to the non-blocking crossbar buffer circuit 101 through the communications network 113.

The non-blocking crossbar buffer circuit 101 is coupled to the processing circuit 102 through one or more interconnections or networks 115 and to the accelerator circuit 103 through one or more interconnections or networks 114. The interconnections or networks 114-115 can be on-die or off-die. As shown in FIGS. 1-2, the non-blocking crossbar buffer circuit 101 is coupled to the host system 206 through interconnections or network 111, to SoC 205 through interconnections or network 112, and to the external systems 201 through communications network 113. The non-blocking crossbar buffer circuit 101 includes a peripheral interface circuit that is used to communicate with the host 206 and the SoC 205 through interconnects/networks 111-112, respectively. The peripheral interface circuit can also communicate with memory 204. The peripheral interface circuit can, for example, be configured to transmit signals according to the Peripheral Component Interconnect Express (PCIe) standard.

Packets of data are transmitted from one or more of the host system 206, the SoC 205, the memory devices 204, and/or the one or more external systems 201 through the interconnections and networks shown in FIGS. 1-2 to the non-blocking crossbar buffer circuit 101. The non-blocking crossbar buffer circuit 101 includes storage circuits (e.g., memory circuits or register circuits) that are configured to store data. The non-blocking crossbar buffer circuit 101 stores the packets of data received from the host system 206, the SoC 205, the memory devices 204, and the one or more external systems 201. The non-blocking crossbar buffer circuit 101 is configured to transmit the stored packets of data, or portions of the stored packets of data, received from the host system 206, the SoC 205, the memory devices 204, and/or the one or more external systems 201 to the processing circuit 102 and/or to the accelerator circuit 103.

The processing circuit 102 and the accelerator circuit 103 can perform networking functions for the packets of data stored in the non-blocking crossbar buffer circuit 101. The processing circuit 102 and the accelerator circuit 103 can, for example, perform networking functions that are defined according to one or more of the layers of the Open Systems Interconnection (OSI) model. Processing circuit 102 can, for example, decode packets of data stored in non-blocking crossbar buffer circuit 101 to determine if security functions, such as encryption or decryption, need to be performed by accelerator circuit 103 on the packets of data. The accelerator circuit 103 can, for example, accelerate the security functions, such as encrypting and decrypting packets of data stored in the non-blocking crossbar buffer circuit 101 or performing cyclic redundancy checks (CRC) on packets of data stored in non-blocking crossbar buffer circuit 101. As other examples, the processing circuit 102 and/or the accelerator circuit 103 can accelerate infrastructure functions, including storage virtualization and network virtualization.

The non-blocking crossbar buffer circuit 101 prevents each data access to a packet of data stored in the non-blocking crossbar buffer circuit 101 from blocking other data accesses to other packets of data stored in non-blocking crossbar buffer circuit 101. For example, a data access to a packet of data stored in non-blocking crossbar buffer circuit 101 by processing circuit 102 does not block a data access to another packet of data stored in non-blocking crossbar buffer circuit 101 by accelerator circuit 103. As another example, data accesses to non-blocking crossbar buffer circuit 101 by any of host system 206, SoC 205, or memory 204 do not block data accesses to non-blocking crossbar buffer circuit 101 by processing circuit 102 or accelerator circuit 103. The non-blocking crossbar buffer circuit 101 functions logically as a crossbar circuit, because each of the circuits 102-103 and each of the systems 201 and 204-206 can access any of the data packets (or portions of the data packets) stored in non-blocking crossbar buffer circuit 101 at any time without being blocked by another data access to non-blocking crossbar buffer circuit 101. Because the buffer circuit 101 allows each of the circuits 102-103 and each of the systems 201 and 204-206 to access the same data packets stored in buffer circuit 101, buffer circuit 101 implements a non-blocking crossbar. The non-blocking crossbar buffer circuit 101 allows concurrent accesses to packets of data stored therein without preventing accesses to other packets of data stored therein. Two or more of circuits 102-103 and systems 201 and 204-206 can access the same data packet or the same data packets (or portions of the same data packets) stored in non-blocking crossbar buffer circuit 101 at different times.

The processing circuit 102 and the accelerator circuit 103 can access data packets stored in non-blocking crossbar buffer circuit 101 or portion of data packets stored in non-blocking crossbar buffer circuit 101. In some examples, the processing circuit 102 and/or the accelerator circuit 103 only need to access a portion of a data packet (or portions of data packets) stored in non-blocking crossbar buffer circuit 101 to perform specific functions. In these examples, only a portion of each of these data packets (e.g., a small portion of each data packet) is transmitted from the non-blocking crossbar buffer circuit 101 to the processing circuit 102 or to the accelerator circuit 103 to perform specific functions, such as networking functions or security functions (e.g., decoding, CRC, encryption, decryption, etc.). As a specific example, only the header portion of each packet of data can be transmitted to the processing circuit 102 or to the accelerator circuit 103, and the processing circuit 102 or the accelerator circuit 103 can perform functions using the header for each packet of data.

As other examples, non-blocking crossbar buffer circuit 101 can send commands or requests to perform functions to processing circuit 102 and/or accelerator circuit 103. Processing circuit 102 and accelerator circuit 103 can perform the functions using the portions of the data packets (e.g., the headers), and then transfer the results of these functions to the non-blocking crossbar buffer circuit 101. The results of these functions are then stored in the non-blocking crossbar buffer circuit 101. The results of these functions can then be transmitted from non-blocking crossbar buffer circuit 101 to any of the host system 206, the SoC 205, the memory devices 204, or the one or more external systems 201. These examples reduce the need to transmit entire data packets from the non-blocking crossbar buffer circuit 101 to the processing circuit 102 and/or to the accelerator circuit 103 to perform the functions of circuits 102-103, which can significantly reduce bandwidth and data congestion in the IPS 100.

IPS 100 includes control logic circuitry that can control the non-blocking data transfers and the accelerations between the non-blocking crossbar buffer circuit 101 and each of the processing circuit 102 (e.g., soft logic circuitry), the accelerator circuit 103, the memory devices 204, the SoC 205, the host system 206, and the external systems 201. The control logic circuitry can, for example, be located in the non-blocking crossbar buffer circuit 101 (e.g., in hard logic), in the processing circuit 102 (e.g., in soft logic), or in other circuitry.

Each of the data packets transmitted to and stored in the non-blocking crossbar buffer circuit 101 can, for example, include or be associated with a handle that functions as an identification (ID) for the packet of data. The handles can, for example, be part of the headers of the packets of data. The handle for each packet of data indicates the storage location (e.g., the address) in the non-blocking crossbar buffer circuit 101 where the packet of data is stored. The handles for the data packets can also be stored in the non-blocking crossbar buffer circuit 101. The control logic circuitry and each of the other components of the server computer 200 can use the handles to identify and access the packets of data stored in the non-blocking crossbar buffer circuit 101. For example, the processing circuit 102 and the accelerator circuit 103 can access packets of data (or portions of packets of data) stored in the non-blocking crossbar buffer circuit 101 based on the handles for the packets of data. In some examples, one or more of the handles can be transferred to the processing circuit 102 or the accelerator circuit 103, and the processing circuit 102 or the accelerator circuit 103 can perform processing functions using the received handles and only portions of (or none of) the data packets identified by the received handles.

The non-blocking crossbar buffer circuit 101 can reduce the data movements between the host system 206, the SoC 205, and the communications network 113 without the need for moving an entire packet of data back and forth between the non-blocking crossbar buffer circuit 101 and circuits 102-103. The non-blocking crossbar buffer circuit 101 can also enable just-in-time and just-enough data movement into the logic circuitry in processing circuit 102 to reduce the footprint of the logic circuitry.

In some implementations, the circuit area of the processing circuit 102 (e.g., the soft logic circuit area) can be reduced by moving some of the data transfer functions to non-blocking crossbar buffer circuit 101. Moving some of the data transfer functions to non-blocking crossbar buffer circuit 101 can reduce the power and thermal footprint of IPS 100, because implementing the data transfer functions in hard logic circuits requires less circuitry that consumes less power. If the processing circuit 102 contains a fabric of programmable logic circuits, processing circuit 102 maintains the flexibility to be configured to implement a custom user circuit design.

Figure 3:
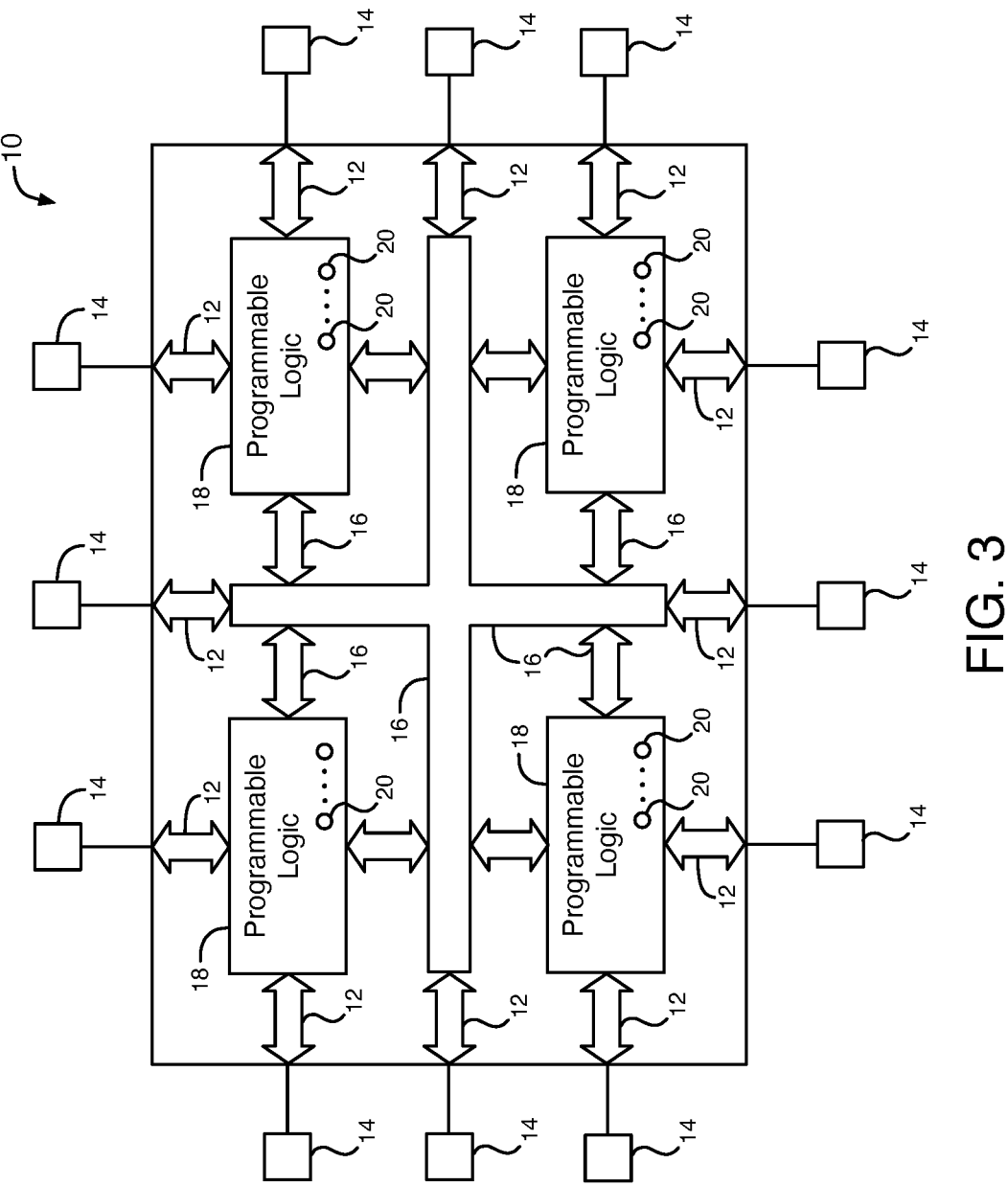
FIG. 3 is a diagram of an illustrative programmable (i.e., configurable) logic integrated circuit (IC) that can be programmed according to a user design to implement the processing circuit and/or the accelerator circuit of FIG. 1.

FIG. 3 is a diagram of an illustrative programmable (i.e., configurable) logic integrated circuit (IC) 10 that can be programmed according to a user circuit design to implement processing circuit 102 and/or accelerator circuit 103. As shown in FIG. 3, programmable logic integrated circuit 10 has input-output circuitry 12 for driving signals off of IC 10 and for receiving signals from other devices via input-output pads 14. Interconnection resources 16 such as global, regional, and local vertical and horizontal conductive lines and buses can be used to route signals on IC 10. Interconnection resources 16 include fixed interconnects (conductive lines) and programmable interconnects (i.e., programmable connections between respective fixed interconnects). Programmable logic circuitry 18 may include combinational and sequential logic circuitry. Programmable logic circuitry 18 can be configured to perform custom logic functions.

Programmable logic IC 10 contains memory elements 20 that can be loaded with configuration data using pads 14 and input-output circuitry 12. Once loaded, the memory elements 20 may each provide a corresponding static control output signal that controls the state of an associated logic component in programmable logic circuitry 18. Typically, the memory element output signals are used to control the gates of field-effect transistors. In the context of programmable integrated circuits, the memory elements 20 store configuration data and are sometimes referred to as configuration random-access memory (CRAM) cells. The configuration data programs the programmable logic 18 to perform the custom logic functions according to the user design.

In general, software and data for performing any of the functions disclosed herein may be stored in non-transitory computer readable storage media. Non-transitory computer readable storage media is tangible computer readable storage media that stores data for a significant period of time, as opposed to media that only transmits propagating electrical signals (e.g., wires). The software code may sometimes be referred to as software, data, program instructions, instructions, or code. The non-transitory computer readable storage media may, for example, include computer memory chips, non-volatile memory such as non-volatile random-access memory (NVRAM), one or more hard drives (e.g., magnetic drives or solid state drives), one or more removable flash drives or other removable media, compact discs (CDs), digital versatile discs (DVDs), Blu-ray discs (BDs), other optical media, and floppy diskettes, tapes, or any other suitable memory or storage device(s).

Additional examples are now described. Example 1 is a circuit system comprising: a processing circuit; an accelerator circuit; and a buffer circuit that stores packets of data and that is coupled to the processing circuit and to the accelerator circuit, wherein the buffer circuit functions as a crossbar circuit by allowing each of the accelerator circuit and the processing circuit to access at least one of the packets of data stored in the buffer circuit during access to another one of the packets of data stored in the buffer circuit.

In Example 2, the circuit system of Example 1 can optionally include, wherein the processing circuit comprises programmable logic circuits configurable to perform custom logic functions using the packets of data.

In Example 3, the circuit system of any one of Examples 1-2 can optionally include, wherein the accelerator circuit accelerates security functions for the circuit system using at least one of the packets of data.

In Example 4, the circuit system of any one of Examples 1-3 can optionally include, wherein the buffer circuit allows the accelerator circuit and the processing circuit to access one of the packets of data stored in the buffer circuit at different times without blocking.

In Example 5, the circuit system of any one of Examples 1~4 can optionally include, wherein the buffer circuit allows the accelerator circuit and the processing circuit to access any of the packets of data stored in the buffer circuit.

In Example 6, the circuit system of any one of Examples 1-5 can optionally include, wherein the buffer circuit allows the processing circuit to access only a portion of each of the packets of data stored in the buffer circuit.

In Example 7, the circuit system of Example 6 can optionally include, wherein the buffer circuit stores headers for the packets of data, and wherein the buffer circuit allows the processing circuit to access the headers.

In Example 8, the circuit system of any one of Examples 1-7 can optionally include, wherein the buffer circuit stores handles that identify the packets of data, and wherein the processing circuit and the accelerator circuit access the packets of data stored in the buffer circuit based on the handles.

In Example 9, the circuit system of any one of Examples 1-8 can optionally include, wherein the buffer circuit is a non-blocking crossbar buffer circuit.

Example 10 is a method for accessing packets of data stored in a buffer circuit in a circuit system, the method comprising: accessing at least a portion of a first packet of data stored in the buffer circuit during a first data access using a processing circuit in the circuit system; performing a first function with the processing circuit using the portion of the first packet of data accessed from the buffer circuit; accessing at least a portion of a second packet of data stored in the buffer circuit during a second data access using an accelerator circuit in the circuit system concurrently with the first data access; and performing a second function with the accelerator circuit using the portion of the second packet of data accessed from the buffer circuit.

In Example 11, the method of Example 10 further comprises: accessing at least a portion of a third packet of data stored in the buffer circuit during a third data access using a device external to the circuit system; and performing a third function with the device using the portion of the third packet of data accessed from the buffer circuit.

In Example 12, the method of any one of Examples 10-11 can optionally include, wherein the buffer circuit is a crossbar buffer circuit.

In Example 13, the method of any one of Examples 10-12 can optionally include, wherein accessing at least the portion of the first packet of data during the first data access comprises accessing a first header, and wherein performing the first function comprises performing the first function with the processing circuit using the first header.

In Example 14, the method of any one of Examples 10-13 can optionally include, wherein accessing at least the portion of the first packet of data during the first data access comprises accessing the portion of the first packet of data using a handle that identifies the first packet of data.

In Example 15, the method of Example 14 can optionally include, wherein performing the first function with the processing circuit comprises performing the first function using the handle.

Example 16 is a circuit system comprising: programmable logic circuits; and a crossbar buffer circuit, wherein a first one of the programmable logic circuits is configurable to access at least a portion of a first packet of data stored in the crossbar buffer circuit during a first data access, and wherein a second one of the programmable logic circuits is configurable to access at least a portion of a second packet of data stored in the crossbar buffer circuit during a second data access concurrently with the first data access.

In Example 17, the circuit system of Example 16 can optionally include, wherein the programmable logic circuits and the crossbar buffer circuit are coupled together within an integrated circuit die.

In Example 18, the circuit system of any one of Examples 16-17 further comprises: an accelerator circuit that accelerates functions for the circuit system, wherein the accelerator circuit is configurable to access at least a portion of a third packet of data stored in the crossbar buffer circuit during a third data access concurrently with the first data access.

In Example 19, the circuit system of any one of Examples 16-18 can optionally include, wherein the first one of the programmable logic circuits is configurable to perform a first function using the portion of the first packet of data accessed from the crossbar buffer circuit, and wherein the second one of the programmable logic circuits is configurable to perform a second function using the portion of the second packet of data accessed from the crossbar buffer circuit.

In Example 20, the circuit system of any one of Examples 16-19 can optionally include, wherein the first one of the programmable logic circuits is configurable to access at least the portion of the first packet of data during the first data access using a first handle that identifies the first packet of data, and wherein the second one of the programmable logic circuits is configurable to access at least the portion of the second packet of data during the second data access using a second handle that identifies the second packet of data.

The foregoing description of the examples has been presented for the purpose of illustration. The foregoing description is not intended to be exhaustive or to be limiting to the examples disclosed herein. In some instances, features of the examples can be employed without a corresponding use of other features as set forth. Many modifications, substitutions, and variations are possible in light of the above teachings.

What is claimed is:

1. A circuit system comprising:

a processing circuit;

an accelerator circuit; and a buffer circuit that stores packets of data and that is coupled to the processing circuit and to the accelerator circuit, wherein the buffer circuit functions as a crossbar circuit by allowing the accelerator circuit and the processing circuit to access first ones of the packets of data stored in the buffer circuit during access to a second one of the packets of data stored in the buffer circuit, wherein the buffer circuit allows the accelerator circuit and the processing circuit to access a third one of the packets of data stored in the buffer circuit at different times without blocking.

2. The circuit system of claim 1, wherein the processing circuit comprises programmable logic circuits configurable to perform custom logic functions using the packets of data.

3. The circuit system of claim 1, wherein the accelerator circuit accelerates security functions for the circuit system using at least one of the packets of data.

4. The circuit system of claim 1, wherein the accelerator circuit is a configurable logic integrated circuit.

5. The circuit system of claim 1, wherein the buffer circuit allows the accelerator circuit and the processing circuit to access any of the packets of data stored in the buffer circuit.

6. The circuit system of claim 1, wherein the buffer circuit allows the processing circuit to access only a portion of each of the packets of data stored in the buffer circuit.

7. The circuit system of claim 6, wherein the buffer circuit stores headers for the packets of data, and wherein the buffer circuit allows the processing circuit to access the headers.

8. The circuit system of claim 1, wherein the buffer circuit stores handles that identify the packets of data, and wherein the processing circuit and the accelerator circuit access the packets of data stored in the buffer circuit based on the handles.

9. The circuit system of claim 1, wherein the buffer circuit is a non-blocking crossbar buffer circuit.

10. A method for accessing buffer circuit in a circuit system, the method comprising:

accessing at least a portion of a first packet of data stored in the buffer circuit during a first data access using a processing circuit in the circuit system;

performing a first function with the processing circuit using the portion of the first packet of data accessed from the buffer circuit;

accessing at least a portion of a second packet of data stored in the buffer circuit during a second data access using an accelerator circuit in the circuit system concurrently with the first data access;

performing a second function with the accelerator circuit using the portion of the second packet of data accessed from the buffer circuit; and allowing the accelerator circuit and the processing circuit to access a third packet of data stored in the buffer circuit at different times without blocking.

11. The method of claim 10 further comprising:

accessing at least a portion of a fourth packet of data stored in the buffer circuit during a third data access using a device external to the circuit system; and performing a third function with the device using the portion of the fourth packet of data accessed from the buffer circuit.

12. The method of claim 10, wherein the buffer circuit is a crossbar buffer circuit.

13. The method of claim 10, wherein accessing at least the portion of the first packet of data during the first data access comprises accessing a first header, and wherein performing the first function comprises performing the first function with the processing circuit using the first header.

14. The method of claim 10, wherein accessing at least the portion of the first packet of data during the first data access comprises accessing the portion of the first packet of data using a handle that identifies the first packet of data.

15. The method of claim 14, wherein performing the first function with the processing circuit comprises performing the first function using the handle.

16. A circuit system comprising:

programmable logic circuits; and a crossbar buffer circuit, wherein a first one of the programmable logic circuits is configurable to access at least a portion of a first packet of data stored in the crossbar buffer circuit during a first data access, wherein a second one of the programmable logic circuits is configurable to access at least a portion of a second packet of data stored in the crossbar buffer circuit during a second data access concurrently with the first data access, wherein the crossbar buffer circuit allows the first one of the programmable logic circuits to access only the portion of the first packet of data stored in the crossbar buffer circuit, and wherein the crossbar buffer circuit allows the second one of the programmable logic circuits to access only the portion of the second packet of data stored in the crossbar buffer circuit.

17. The circuit system of claim 16, wherein the programmable logic circuits and the crossbar buffer circuit are coupled together within an integrated circuit die.

18. The circuit system of claim 16 further comprising:

an accelerator circuit that accelerates functions for the circuit system, wherein the accelerator circuit is configurable to access at least a portion of a third packet of data stored in the crossbar buffer circuit during a third data access concurrently with the first data access.

19. The circuit system of claim 16, wherein the first one of the programmable logic circuits is configurable to perform a first function using the portion of the first packet of data accessed from the crossbar buffer circuit, and wherein the second one of the programmable logic circuits is configurable to perform a second function using the portion of the second packet of data accessed from the crossbar buffer circuit.

20. The circuit system of claim 16, wherein the first one of the programmable logic circuits is configurable to access at least the portion of the first packet of data during the first data access using a first handle that identifies the first packet of data, and wherein the second one of the programmable logic circuits is configurable to access at least the portion of the second packet of data during the second data access using a second handle that identifies the second packet of data.

* * * * *